United States Patent [19]
Campanile et al.

[11] Patent Number: 6,010,098
[45] Date of Patent: Jan. 4, 2000

[54] AERODYNAMIC STRUCTURE, FOR A LANDING FLAP, AN AIRFOIL, AN ELEVATOR UNIT OR A RUDDER UNIT, WITH A CHANGEABLE CAMBERING

[75] Inventors: Lucio Flavio Campanile; Holger Hanselka, both of Braunschweig, Germany

[73] Assignee: Deutsches Zentrum Fur Luft-Und Raumfahrt E.V., Bonn, Germany

[21] Appl. No.: 09/028,606

[22] Filed: Feb. 24, 1998

[30] Foreign Application Priority Data

Feb. 25, 1997 [DE] Germany ............................ 197 07 392

[51] Int. Cl.⁷ ........................................................ B64C 3/49
[52] U.S. Cl. ......................................... 244/219; 244/75 R
[58] Field of Search .................................. 244/213–215, 244/219, 75 R

[56] References Cited

U.S. PATENT DOCUMENTS

| | | | |
|---|---|---|---|
| 2,022,806 | 12/1935 | Grant | 244/12 |
| 3,076,623 | 2/1963 | Lyon | 244/219 |
| 3,179,357 | 4/1965 | Lyon | 244/44 |
| 3,716,209 | 2/1973 | Pierce | 244/219 |
| 3,987,984 | 10/1976 | Fischer | 244/44 |
| 4,252,287 | 2/1981 | Zimmer | 244/219 |
| 4,341,176 | 7/1982 | Orrison | 244/219 |
| 4,349,169 | 9/1982 | McAnally | 244/219 |
| 4,386,574 | 6/1983 | Riolland | 244/219 |
| 4,865,275 | 9/1989 | Thompson | 244/219 |
| 5,529,458 | 6/1996 | Humpherson | 244/219 |
| 5,531,407 | 7/1996 | Austin et al. | 244/219 |
| 5,626,312 | 5/1997 | Head | 244/219 |

FOREIGN PATENT DOCUMENTS

| | | | |
|---|---|---|---|
| 536494 | 5/1922 | France | 244/219 |
| 554771 | 6/1923 | France . | |
| 770113 | 9/1934 | France | 244/219 |
| 2445267 | 12/1978 | France . | |
| 366 693 | 12/1916 | Germany . | |
| 29 07 912 | 9/1980 | Germany | B64C 3/48 |
| US94/05053 | 5/1994 | WIPO . | |

*Primary Examiner*—Galen L. Barefoot
*Attorney, Agent, or Firm*—Womble Carlyle Sandridge & Rice

[57] ABSTRACT

An aerodynamic structure (9) is provided for example for a landing flap. The aerodynamic structure comprises an outer skin (11), which is deformable in cross section longitudinal to an air stream direction (12). The outer skin (11) has deformable ribs (1) with changeable cambering for stiffening the stressed skin in cross section longitudinal to the air stream direction. The ribs (1) comprise a closed flexible external girdle (2). The external shape of the external girdle (2) corresponds to the course of the outer skin (11). Furthermore, the ribs (1) comprise a plurality of stiffening struts (3) of constant length, which engage the external girdle (2) at both of their ends.

12 Claims, 16 Drawing Sheets

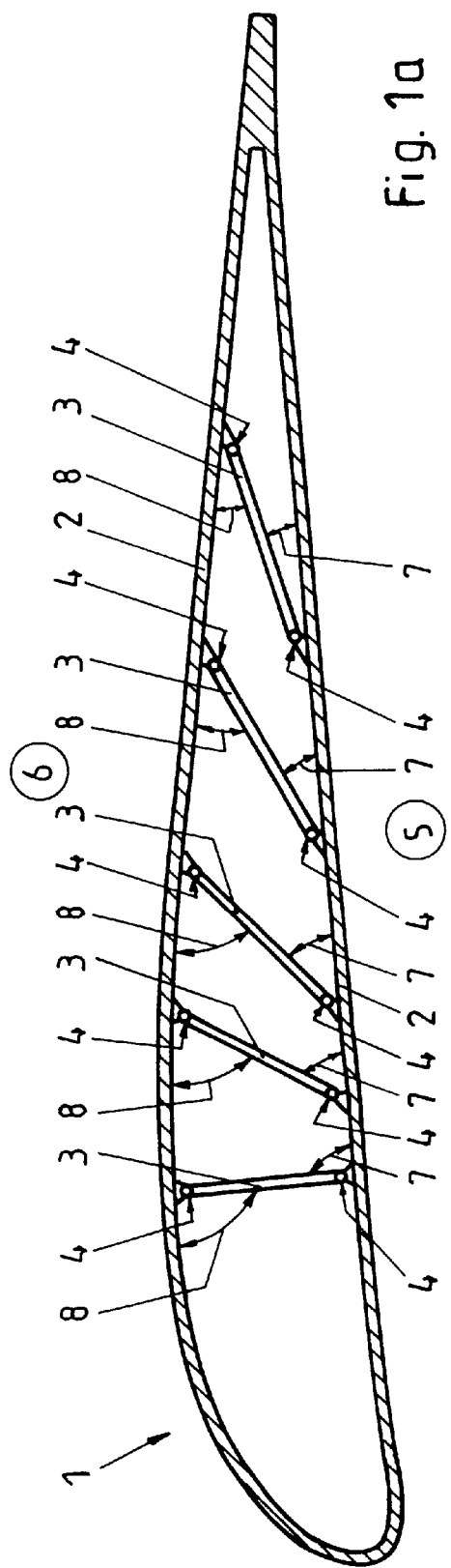
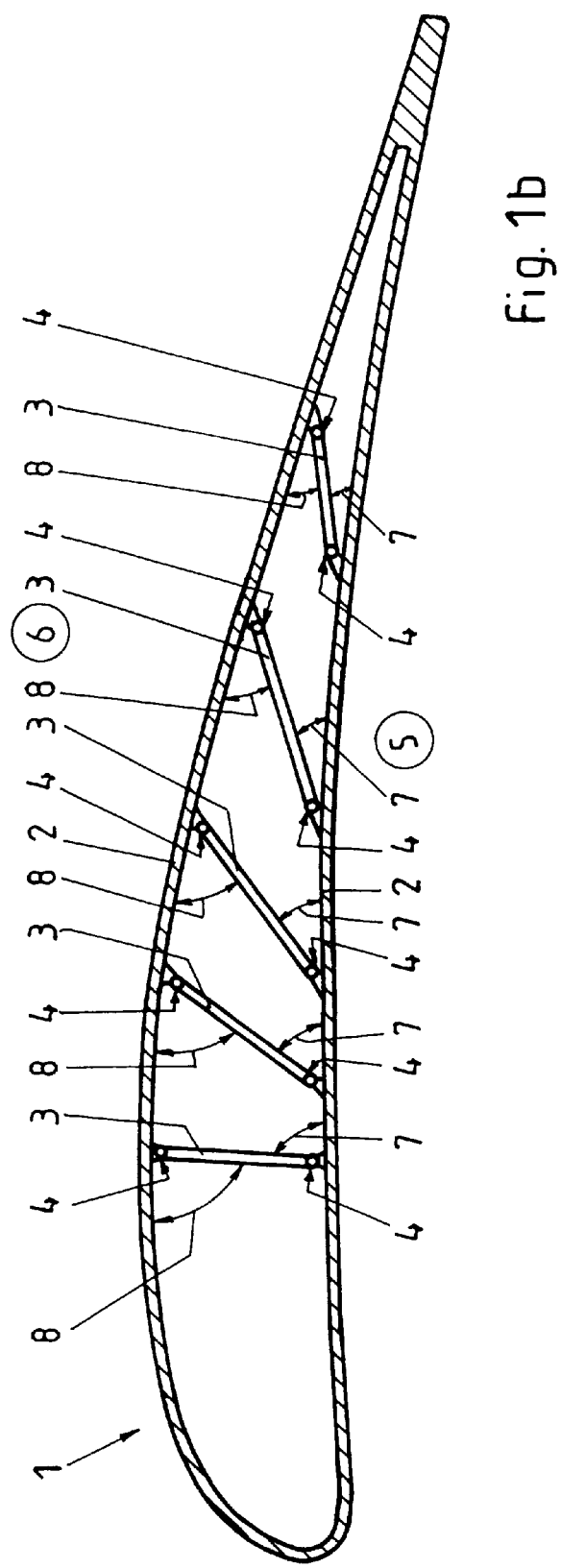

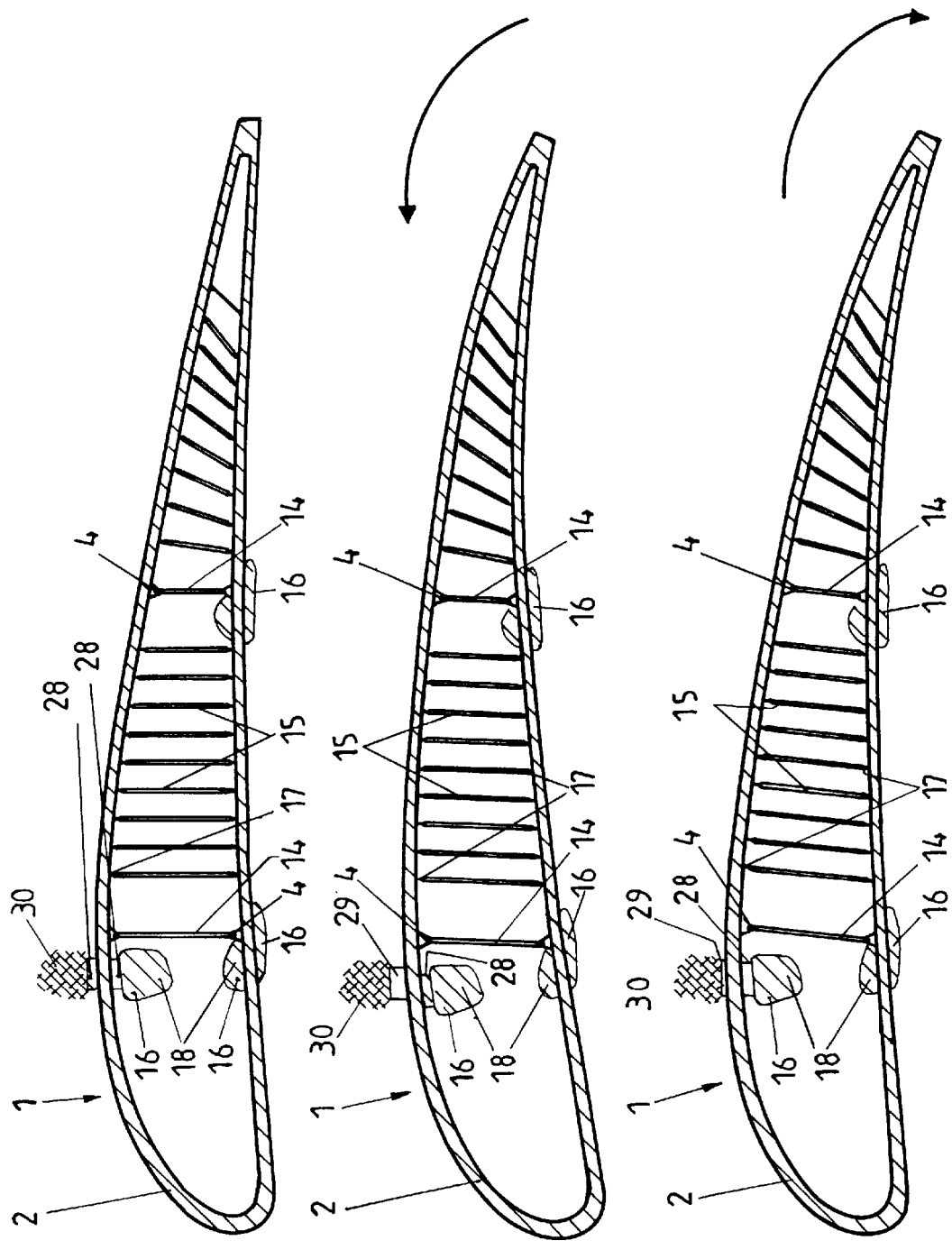

AERODYNAMIC STRUCTURE, FOR A LANDING FLAP, AN AIRFOIL, AN ELEVATOR UNIT OR A RUDDER UNIT, WITH A CHANGEABLE CAMBERING

FIELD OF THE INVENTION

The invention relates to an aerodynamic structure, which comprises an outer skin deformable in cross section longitudinal to an air stream direction. The outer skin comprises ribs with a changeable cambering, the ribs stiffening the outer skin and being deformable in cross section longitudinal to the air stream direction. Such an aerodynamic structures can be provided for a landing flap for an airfoil of an airplane or for an airfoil itself, but it can also be provided for example for an elevator unit or a rudder unit and the like.

BACKGROUND OF THE INVENTION

Aerodynamic structures can be of changeable external shape, for example to change the lift of an airfoil or to actuate an elevator unit or rudder unit. In aerodynamic structures, which have no deformable design, these functions are realized by the swivelling of jointed flaps. Aerodynamic structures with an outer skin deformable in cross section longitudinal to an air stream direction are known from U.S. Pat. No. 3,179,357, U.S. Pat. No. 3,716,202 and U.S. Pat. No. 4,349,169. U.S. Pat. No. 5,531,407 discloses an aerodynamic structure, which comprises an deformable outer skin with ribs of changeable cambering, the ribs stiffening the outer skin in cross section longitudinal to the air stream direction.

Aerodynamic structures for flying machines are subjected to a strict rule of lightweight construction, i.e. they have to be optimized with regard to their weight and to their load supporting properties. An usual construction of an airfoil fulfilling these boundary conditions comprises an outer skin, which is stiffened by ribs. Each rib is arranged longitudinal to the air stream direction. The ribs are arranged side by side at distance in the direction of main extension of the outer skin. The single ribs can consist of plates with border regions, which form wraparound frames. The outer skin is mounted on the frame of the ribs and firmly connected to the ribs. Thus, a sufficient structural stability results, i.e. sufficient load supporting properties of the whole airfoil at low weight.

SUMMARY OF THE INVENTION

It is an object of the invention to improve an aerodynamic structure with changeable cambering, which fulfils the boundary conditions of lightweight construction.

The Invention provides an aerodynamic structure for a landing flap, an airfoil, an elevator unit or a rudder unit, for example. The aerodynamic structure comprises an outer skin deformable in cross section longitudinal to an air stream direction, and deformable ribs. The ribs stiffen said outer skin in cross section longitudinal to said air stream direction; the deformable ribs are of changeable cambering; and the ribs have a closed flexible external girdle. The external girdle has an outer shape corresponding to the course of said outer skin, and comprises a plurality of stiffening struts of constant length.

The basic construction of the new aerodynamic structure is similar to an airfoil according to the state of the art. Nevertheless, the stiffening struts do not result in a complete stiffening of the single ribs, but they permit a deformation of the external girdle of the ribs, which are intentionally provided flexible. With this deformation, the angles of inclination between the external girdle and the stiffening struts, which engage the external girdle, change. The deformation is applied to the deformable outer skin mounted on the external girdle. In turn, the cambering of the aerodynamic structure can be adjusted by way of applying a force, which changes the angles of inclination between the girdle and the struts. The external girdle of the ribs is always kept closed while being deformed, and it is essentially subjected to bending like a girder. As a whole, the new aerodynamic structure is of a lower weight at a considerably increased functionality.

For the deformation of the ribs, mechanical actuators can be provided, which directly or indirectly engage the external girdle and/or the stiffening struts, so that the angles of inclination between the external girdle and the stiffening struts change in case of a drive of the actuators.

But it is also possible to use an mechanism, which is already existing for moving the aerodynamic structure, to impose forces, which are necessary for the deformation of the ribs. Even aerodynamic forces can be used to deform the ribs. In both cases, an interlocking mechanism has to be provided to selectively fix the changed shape of the ribs.

Aerodynamic forces can also be utilized to reduce the expenditure of force for mechanical actuators during the transformation of the ribs in their modified shape. Whereas special aerodynamic actuators are required for the entire deformation, for example flaps, which can be activated, a suited arrangement of the stiffening struts is sufficient for the reduction of the expenditure of force for the deformation, so that the elastic and, if need be, aerodynamic forces for deforming definite regions of the external girdle are partially compensated in other regions of the external girdle by means of aerodynamic forces.

Preferably, the outer skin of the new aerodynamic structure is firmly connected to the outer skin. Thus, the outer skin follows all changes of curvature of the ribs.

This is particularly important, if the stiffening struts are connected to the external girdle via joints. This kind of construction has no flexural rigidity in cross section longitudinal to the air stream direction between the stiffening struts and the external girdle. The whole rigidity of the profile of the aerodynamic structure then depends on the flexural rigidity of the external girdle of the ribs, on the outer skin and even on the actuators. A joint between a stiffening strut and the external girdle does not necessarily mean a multipart arrangement, but may include a local region between the stiffening struts and the external girdle with low flexural rigidity. The stiffening struts and the external girdle can be swivelled around this region against each other.

From the point of view of the passive rigidity of profile it can be useful to build up the engaging regions of the stiffening struts at the external girdle relatively rigid. The rigidity of profile of the aerodynamic structure may not be too small to avoid unintentional deformations due to the application of external forces. In any case, the flexural rigidity of the stiffening struts is to be selected considerably greater than the flexural rigidity of the external girdle of the ribs. Thus, a compression of the aerodynamic structure is prevented, for example because of external forces.

In a concrete embodiment of the new aerodynamic structure, the actuators, on the one hand, engage the external girdle and, on the other hand, engage a stiffening strut to influence the angle of inclination of the respective stiffening strut directly with regard to the external girdle. But it is also possible to let the actuators act between the stiffening struts, between their engaging regions at the external girdle and/or between regions of the external girdle. Additionally it is possible to provide the actuators between a supporting structure and the external girdle and/or one or more stiffening struts. Furthermore, the usage of actuators in layers is possible. These can be directly positioned on the external girdle, for example in kind of a piezoceramic layer. They can also be integrated in an external girdle made of a fibrous compound material. Alternatively, parts of the external girdle can be for example of a shape memory alloy. In case of a drive of actuators in layers, the cambering of the external girdle is directly changed. But also in this case the stiffening struts have an influence on the change of the cambering and they change their angle of inclination with regard to the external girdle of the ribs.

One actuator can be provided on either end of each stiffening strut, which on the one hand engages the external girdle and on the other hand engages the stiffening strut. In this case, the actuators should be arranged in the region of the smaller angle of inclination between the stiffening strut and the external girdle, because here, easier leverages are given for the intended bending of the external girdle.

An aerodynamic structure with a concave-curved side of overpressure and with a convex-curved side of negative pressure, for example a landing flap for an airfoil of an airplane, preferably has an arrangement of the stiffening struts in that way, that the distance of two neighboured stiffening struts is smaller on the concave-curved side of overpressure than on the convex-curved side of negative pressure. With a change of the angle of inclination of the stiffening strut to the external girdle of the ribs, both the concave curvature of the outer skin on the side of overpressure and the convex curvature of the outer skin on the side of negative pressure rise. Thus, also the lift of the profile increases. The arrangement of the stiffening struts, which is described here in case of a landing flap, is an example for the basic rule of the invention to provide the stiffening struts so far as possible in such a way, that they effect a transmission of energy in direction of the intended bending strain of the external girdle of the ribs, only. Additionally, the stiffening struts should be arranged in such a way that a compressive or a tensile load on the external girdle is minimized. Apart from that, absolute transverse loads on the external girdle, which guide to a bulging of the external girdle should be avoided.

By means of a plurality of ribs, which are arranged side by side and which are driven differently, a torsion of the outer skin about an axis perpendicular to the air stream direction can be obtained. This effect is not only usable to impose a specific torsion on the outer skin. Rather, the effects of an external force tending to deform the aerodynamic structure torsionally in an opposite direction can be compensated.

In case of a sufficient rigid outer skin, the new aerodynamic structure does not need to provide an external girdle of the ribs as a separate structural structure. Instead, it is possible to integrate the girdle of the ribs in the outer skin.

BRIEF DESCRIPTION OF THE DRAWINGS

In the following, the invention is explained and described detailed by means of preferred embodiments. In the drawings, FIG. 1 is a cross section of a rib of an aerodynamic structure according to the invention in two positions with different cambering, FIG. 16 shows a proceeding to deform the rib according to FIG. 7 with application of an existing mechanism for swivelling the aerodynamic structures.

DETAILED DESCRIPTION OF THE PREFERRED EMBODIMENTS

Figure 2:
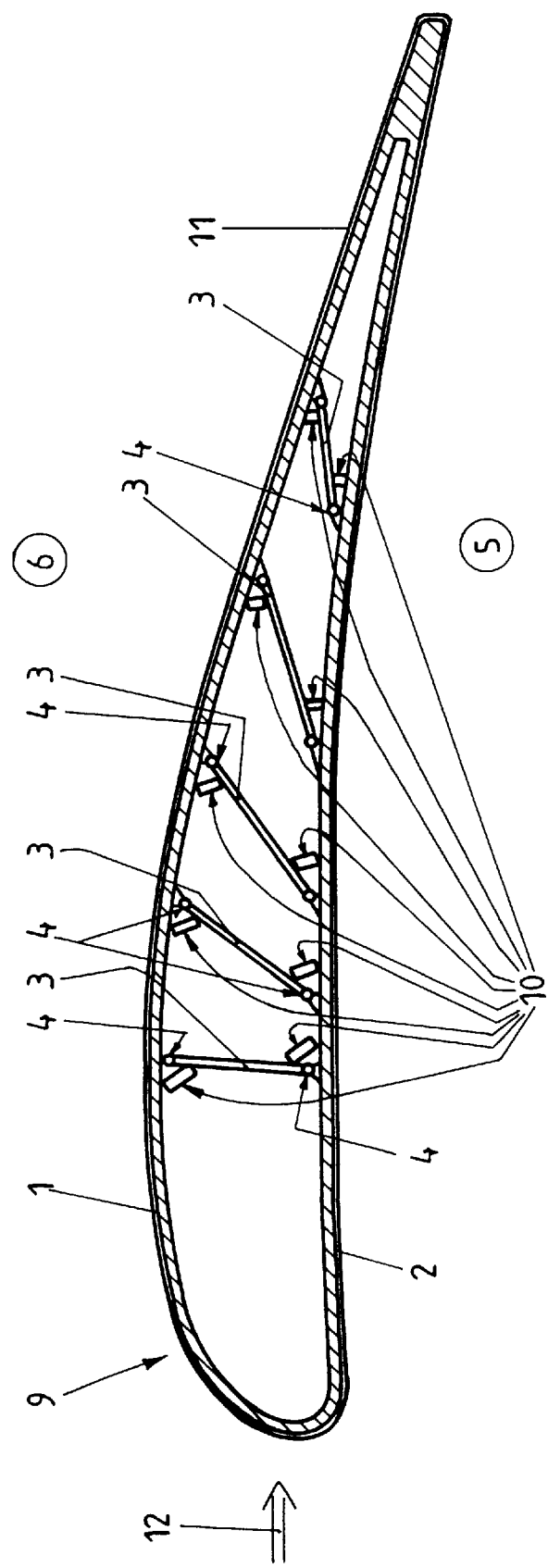
FIG. 2 is a cross section of an aerodynamic structure according to the invention with the rib according to FIG. 1.

Referring to the FIGS. 1 to 16, aerodynamic structures according to the invention are illustrated as high-lift flaps for an airfoil of an airplane (not shown), only. High-lift flaps are also designated as landing flaps. However, the invention is not restricted to high-lift flaps for airfoils. The invention can also be applied to airfoils, to elevator units and to rudder units, for example. The description of the invention by means of landing flaps is not intended to limit the scope of the invention.

FIGS. 1a and 1b show a ribs 1 in two different positions. In the position of FIG. 1b, the cambering of the rib 1 is greater than in the position of FIG. 1a. The rib 1 essentially comprises a closed flexible external girdle 2 and an arrangement of stiffening struts 3 of constant length. The stiffening struts 3 engage the external girdle 2 at each of their ends. Joints 4 are positioned between the external girdle 2 and the ends of the stiffening struts 3. The joints 4 may be made of several parts as indicated in FIG. 1, but they may also be built up of one single part by means of a special flexible region. Because of the joints 4, the engaging regions of the stiffening struts 3 at the external girdle 2 do not show a worth mentioning flexural rigidity. On the other hand the stiffening struts 3 are extremely rigid compared to the external girdle 2, and thus the stiffening struts prevent a compression of the external girdle 2 by means of external forces. However, the stiffening struts 3 are arranged in such a way, that they do allow an intentional deformation of the ribs 1. This is the increase of the cambering between FIG. 1a and FIG. 1b. Concretely, the stiffening struts 3 do not cross each other, and the distances of the engaging regions of the stiffening struts 3 at the external girdle 2 are smaller at the side of overpressure 5 of the rib 1 than at the side of negative pressure 6 of the rib 1. Due to the cambering change of the rib 1, the angles of inclination 7 and 8 between the external girdle 2 and the stiffening struts 3 change. The angles of inclination 7 and 8, which are out-lined in FIG. 1, decrease with an increasing cambering of the rib 1.

This relation between the cambering of the rib 1 and the angles of inclination 7 and 8 is used in an aerodynamic structure 9 according to FIG. 2 for an arbitrary variation of the cambering. Mechanical actuators 10 are arranged between the external girdle 2 and the stiffening struts 3 according to FIG. 1 in the region of the angles of inclination 7 and 8 (according to FIG. 1, not shown here). The actuators 10 can be usual mechanical actuators, for example based on piezoelectric crystals or magnetostrictive materials. The rib 1 is covered with an outer skin 11, which is firmly connected to the rib. The outer skin 11 forms the external surface of the aerodynamic structure 9. FIG. 2 illustrates a cross section longitudinal to an air stream direction 12. With regard to FIG. 2, the whole flexural rigidity of the aerodynamic structure 9 in the drawing results from the flexural rigidity of the external girdle 2 and the outer skin 2 and from the stiffness of the actuators 10. Here, the stiffening struts 3 can be considered inflexible. The actuators 10 are each arranged in the region of the smaller angles of inclination of the rib 1 to the external girdle 2, because here, easier attachment conditions are given. Besides, also the leverages are easier for a deformation of the external girdle 2.

Figure 3:
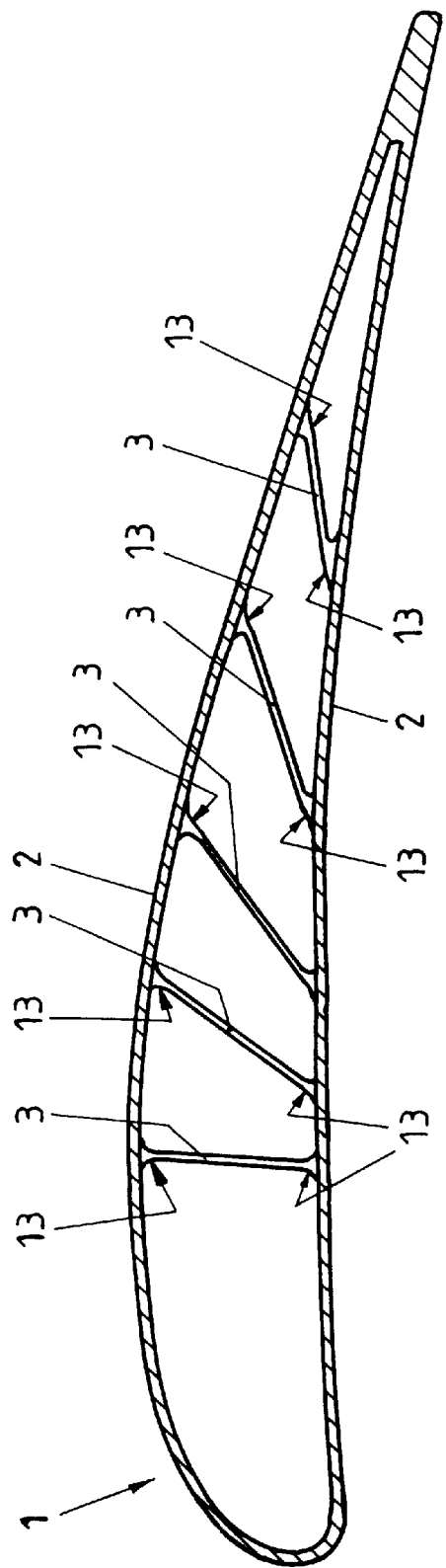
FIG. 3 is a cross section of an alternative embodiment of the rib of an aerodynamic structure according to the invention.
Figure 4:
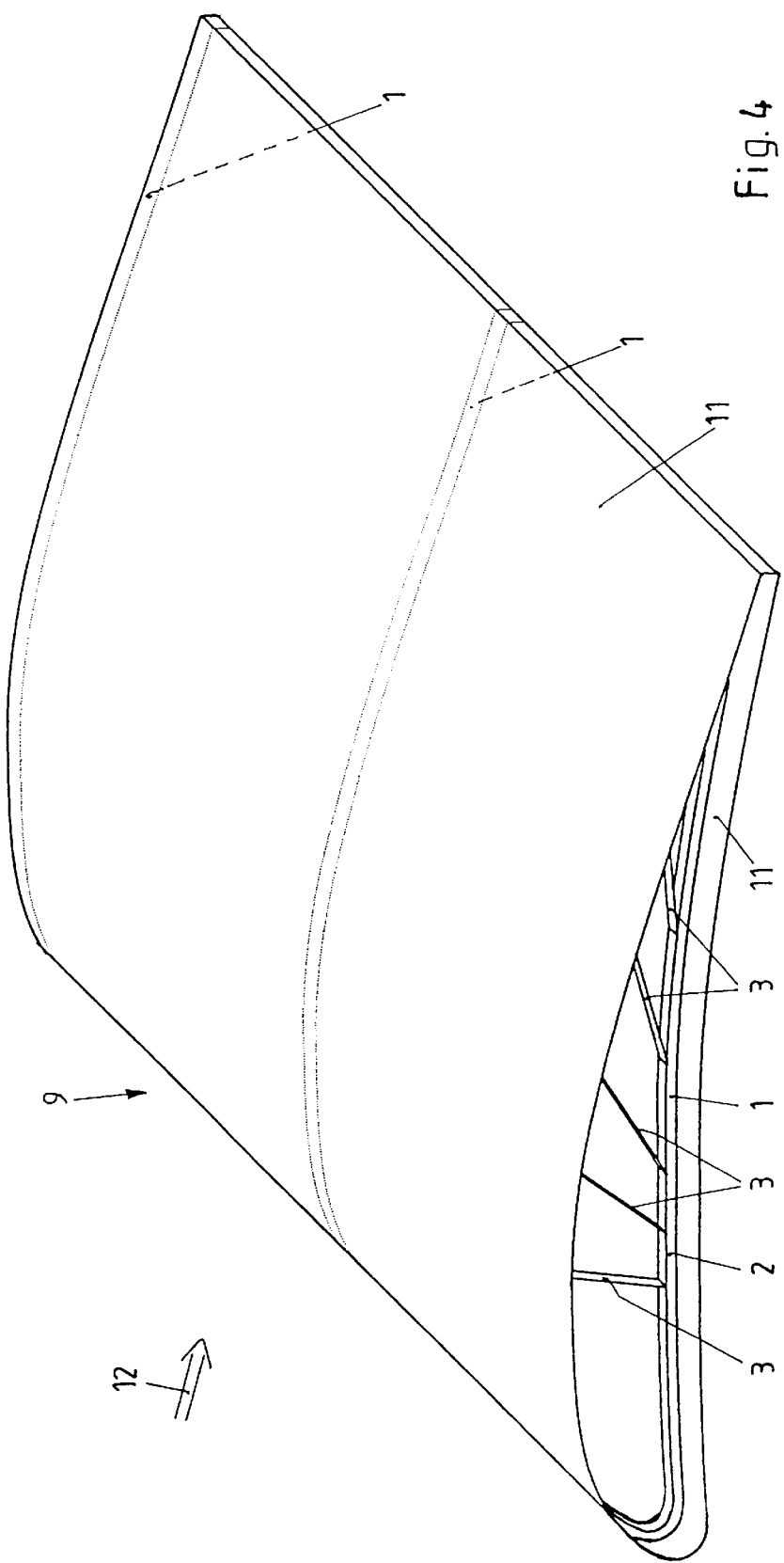
FIG. 4 is a perspective view of an aerodynamic structure according to the invention, FIG. 5 a diagrammatic view of a torsion of an aerodynamic structure according to the invention.

In the alternative embodiment of a rib 1 out-lined in FIG. 3, the transition regions 13 between the stiffening struts 3 and the external girdle 2 are rigid. This means, that compared to the embodiments according to FIGS. 1 and 2, no joints 4 are provided. Instead, the material is even strengthened here to avoid a bending of the stiffening struts 3 in the engaging regions. The advantage of the embodiment of the rib 1 according to FIG. 3 is, that the flexural rigidity is considerably greater than in case of the embodiment according to FIGS. 1 and 2. Subsequently, a deformation to change the cambering of the rib 1 can only be induced with stronger forces compared to the embodiment referring to the FIGS. 1 and 2. FIG. 4 is a perspective representation of a part of an aerodynamic structure 9, i.e. of a part of the landing flap given as an example for the invention. The visible components of the front rib 1 are represented in a simplified way. In the direction of main extension of the aerodynamic structure 9, a plurality of neighboured ribs 1 is provided, the outer skin 11 being firmly connected to each of the ribs 1.

Figure 5:
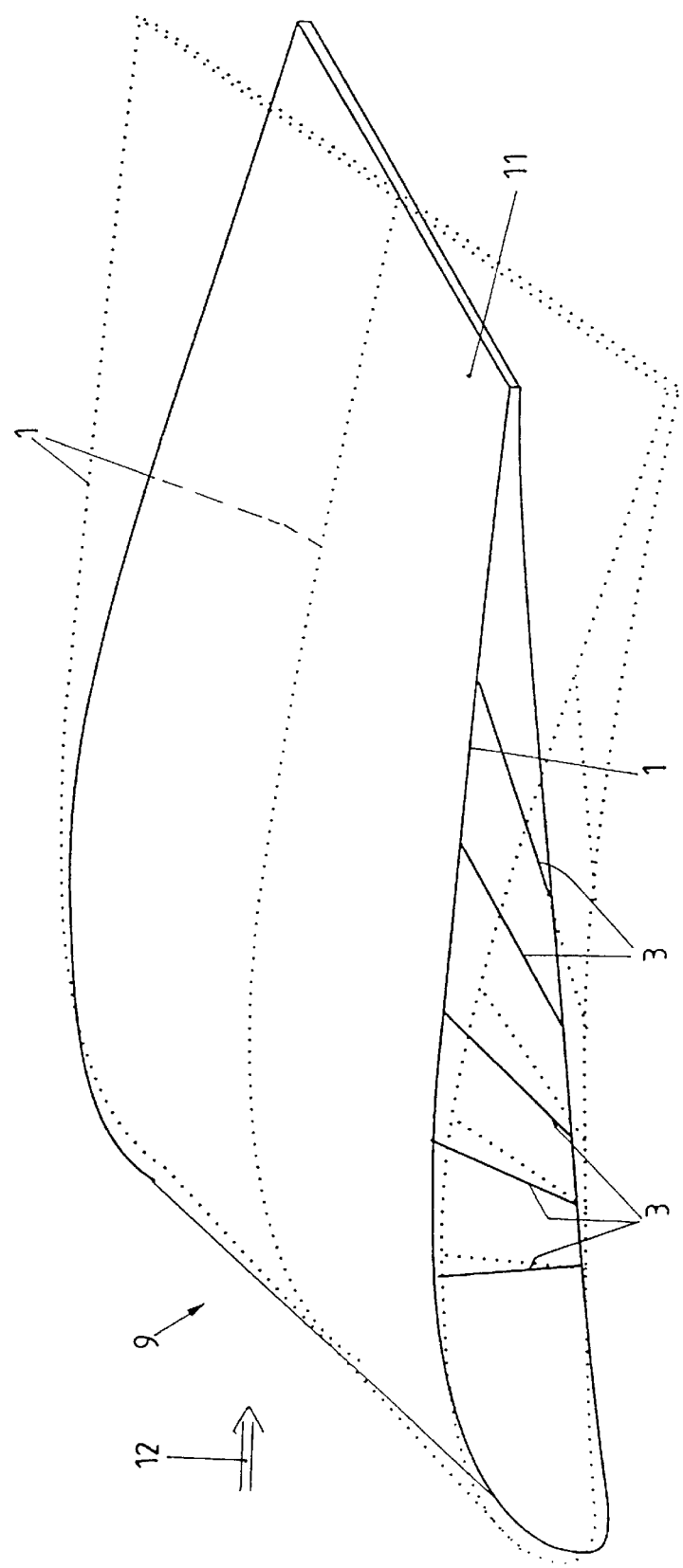

FIG. 5 out-lines a torsion of the aerodynamic structure 9. The torsion occurs, for example, if the middle rib of three ribs 1 arranged as neighbours is not driven and if both outer ribs 1 are driven to a deformation in opposite directions. FIG. 5 shows with dotted lines a diagrammatic perspective representation of the aerodynamic structure 9, which corresponds to FIG. 4. The twisted aerodynamic structure 9 is illustrated likewise schematically and perspectively with continuous lines.

Figure 6:
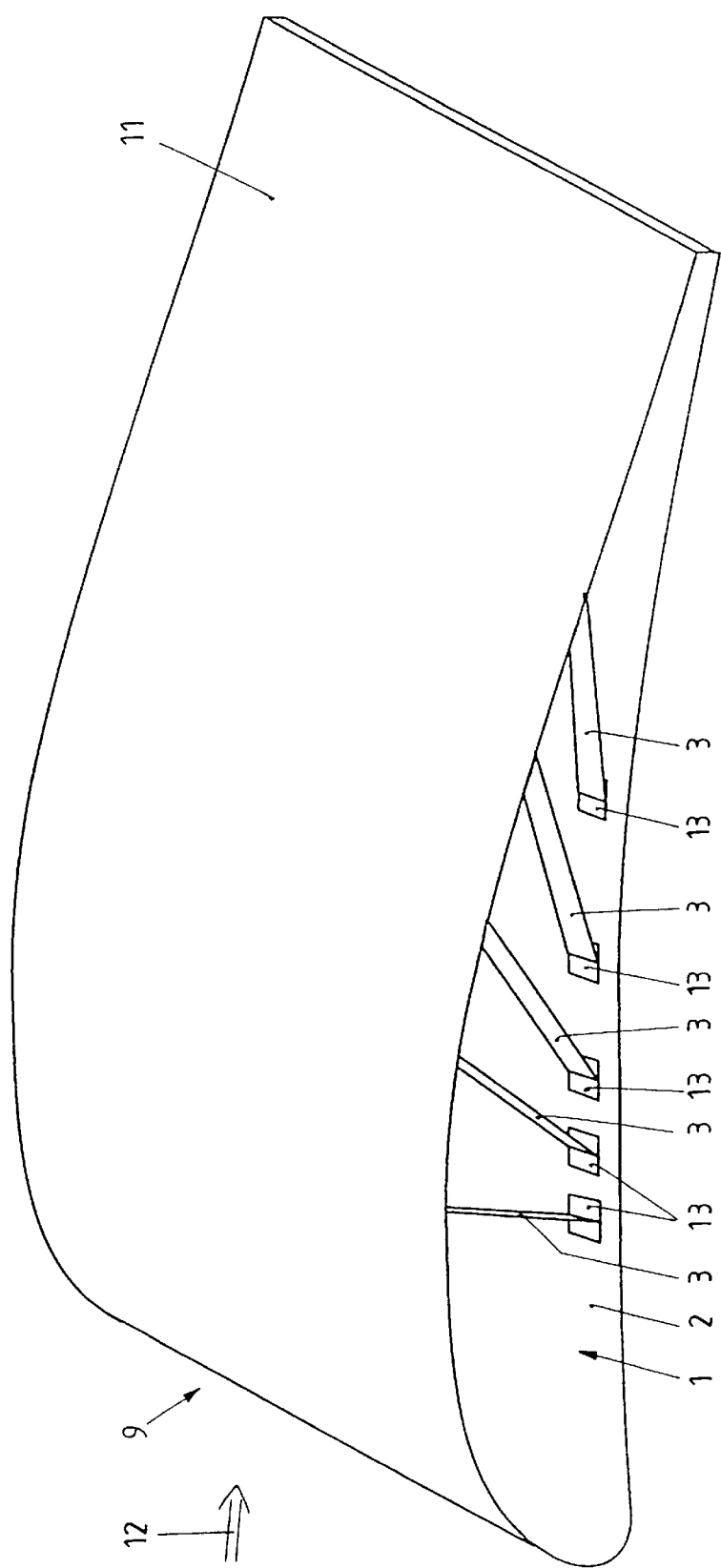
FIG. 6 is a special embodiment of an aerodynamic structure according to the invention in perspective representation.

With regard to the embodiment of the aerodynamic structure 9 in FIG. 6, the external girdle 2 of the visible rib 1 and the outer skin 1 are one-piece. The girdle 2 of the visible rib 1 is integrated in the outer skin 11. This means, that there is no separate external girdle 2 apart from the outer skin 11. In the strengthened transition regions 13, the stiffening struts 3 directly engage the outer skin 11. Thus, the outer skin 11 forms the external girdle. Contrary to the embodiment according to the FIGS. 1 to 5, a much lighter construction of the aerodynamic structure 9 is achieved by the aerodynamic structure 9 according to FIG. 6.

Figure 7:
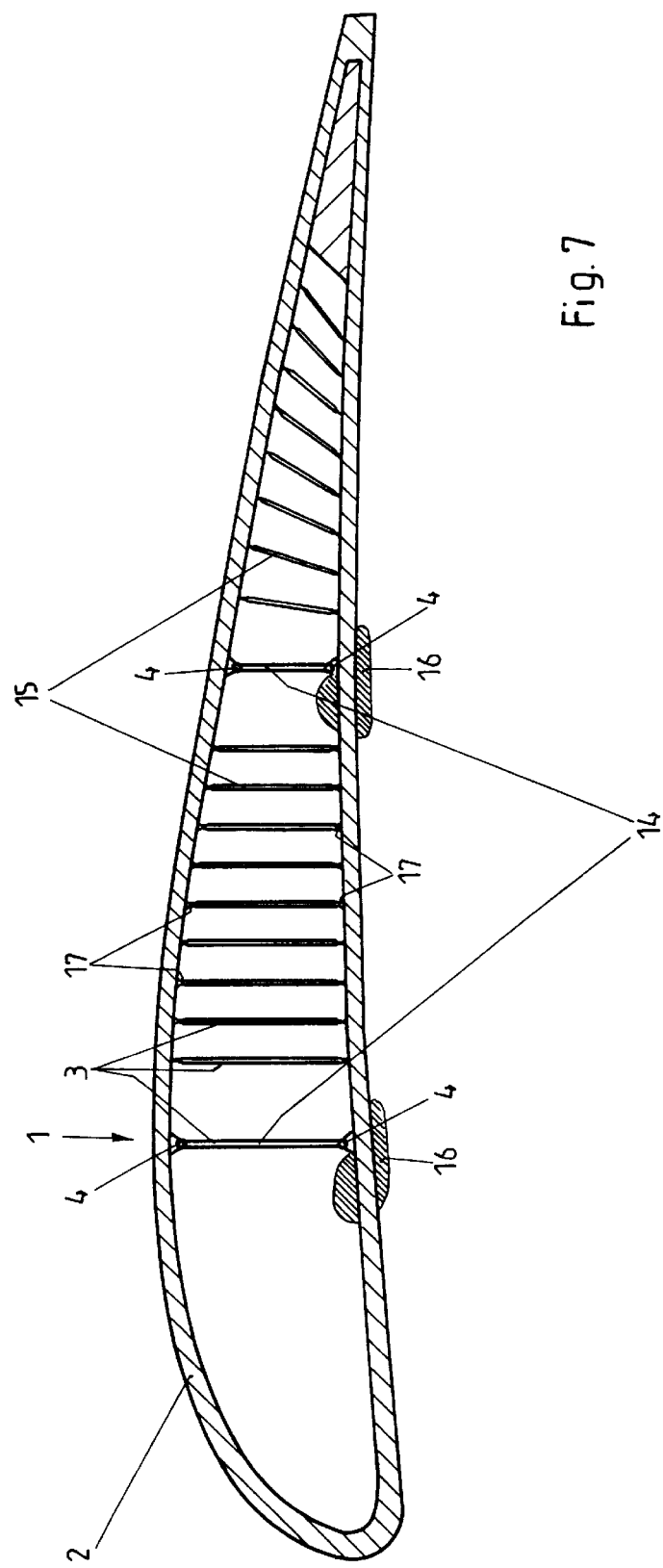
FIG. 7 is a side view of a further alternative embodiment of a rib of an aerodynamic structure according to the invention.

The rib 1 as shown in FIG. 7 comprises two kinds of length constant stiffening struts 3. Two stiffening struts 3 are built up as main struts 14 while the other stiffening struts 3 are built up as secondary struts 15. The main struts 14 are formed particularly steady and they are provided for the attachment of the rib 1 to a supporting structure 16, which is out-lined in hatched areas. The attachment of the rib 1 to the supporting structure 16 is required for bearing aerodynamic forces, which act upon the outer skin (not shown here). The secondary struts 15 between the main struts 14 are arranged in parallel and parallelly to the main struts 14. The secondary struts 15 behind the rear main strut 14 are arranged with increasing incline. This is an optimized arrangement, which realizes a concentration of the cambering flexibility of the rib 1 in backward region. The connections between the stiffening struts 3 and the external girdle 2 are realized as flexible connections. The main struts 14 are provided with joints 4. The secondary struts 15 are provided with predetermined bending points 17. This is sufficient because of the lower load on the secondary struts 15.

Figure 8:
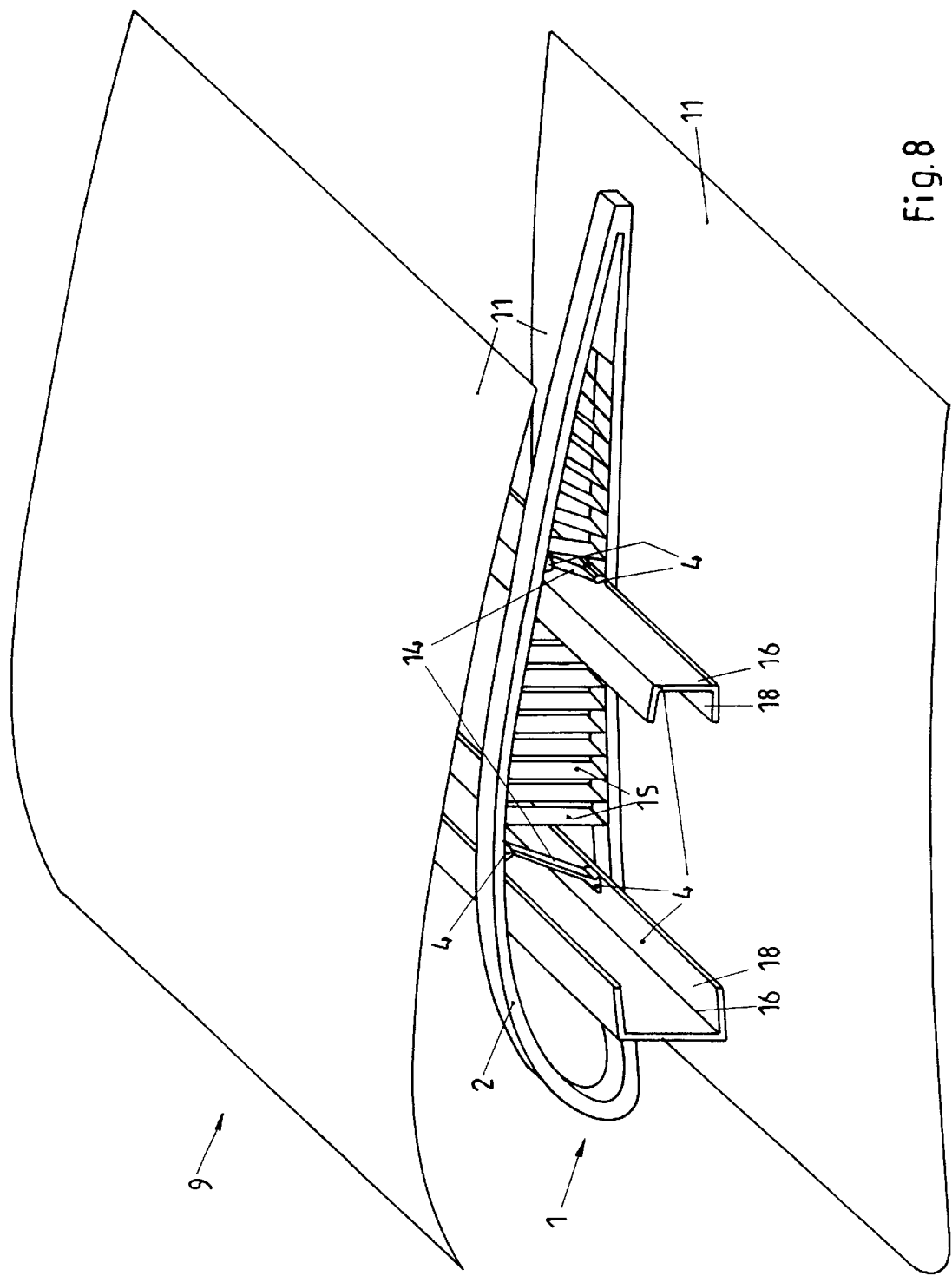
FIG. 8 is an exploded view of an aerodynamic structure with a practical embodiment of the rib with regard to FIG. 7.

The attachment of the rib 1 to the supporting structure 16 can be seen in FIG. 8. As components of the supporting structure 16 two spars 18 are provided. Spars exist in most of the usual wing structures. The spars 18 are jointed to the main struts 14 in the region of the lower joints 4, and thus they are connected with the whole rib 1. The external girdle 2 is supported on the bottom side of the spars 16. In FIG. 8, the outer skin 11 of the aerodynamic structure 9 is divided into a bottom side and a top side for illustration purposes.

Figure 9:
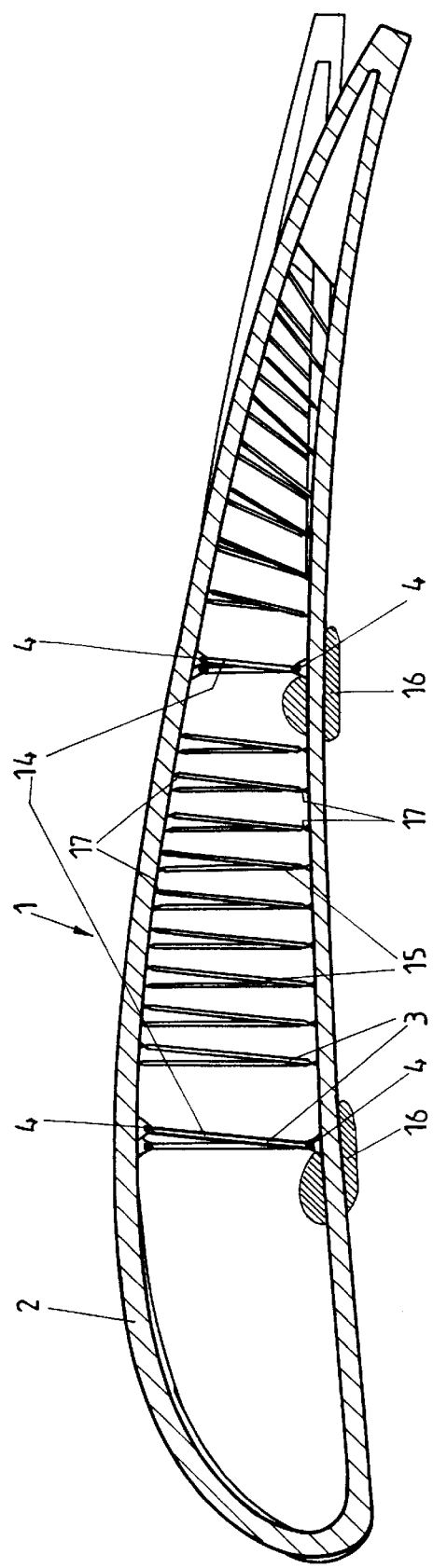
FIG. 9 shows a deformation of a rib according to FIG. 7.

FIG. 9 shows the rib 1 according to FIG. 7 in a deformed condition, illustrating a non-deformed rib 1 in the background. The change of curvature of the rib 1 is seen in the back region of cambering. The deformation, as shown in FIG. 9, follows from the special arrangement of the stiffening struts 3 with regard to the external girdle 2. The demonstrated deformation occurs relatively independent of where the forces for the deformation are applied. Therefore, there is a multitude of engaging possibilities for actuators. Further, the rib 1 is independent of a definite kind or operation of the actuators.

Figure 10:
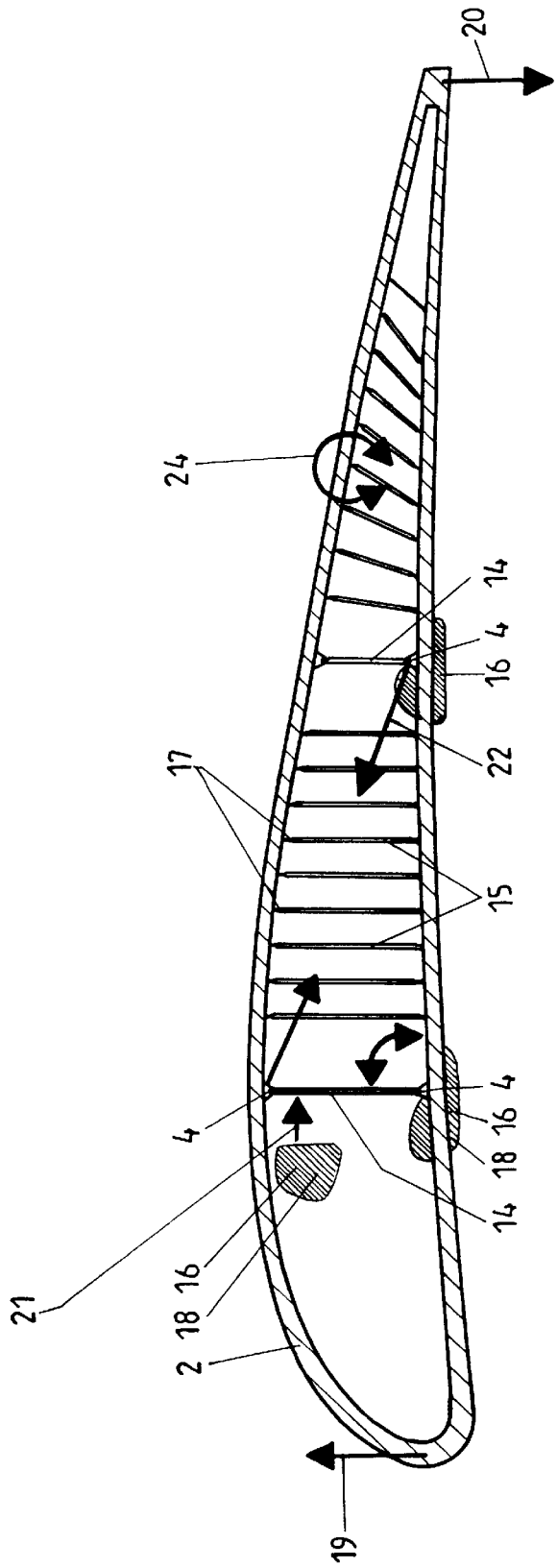
FIG. 10 shows different engaging possibilities of different actuators at a rib with regard to FIG. 7.

FIG. 10 out-lines different possibilities for applying the actuators at the rib according to FIG. 7 to achieve the deformation according to FIG. 9. An arrow 19 indicates, how the deformation can be achieved in the nose region of the rib by means of a force directed upward, for example provided by an aerodynamic actuator in form of a flap, which can be activated.

The arrow 20 indicates, how the deformation in the trailing edge region of the rib 1 can be achieved by means of a force directed downward. An arrow 21 stands for an actuator between a spar 18 of the supporting structure 16 and the front main strut 14. Arrows 22 stand for the application of an actuator between the upper joint 4 of the front main strut 14 and the lower joint 4 of the rear main strut 14. A rotating arrow 23 stands for an active joint between the external girdle 2 and the front main strut 14 in its lower region or for an actuator, which acts around the lower joint 4 of the front main strut 14, respectively. A further rotating arrow 24 stands for a structural integrated actuatoric in the rear region of cambering.

The following Figures represent results of a FEM-simulation based on a model of the rib 1 according to FIG. 7 with the following data:

| | |
|---|---|
| profile length | 1500 mm |
| cross section of the girdle | 50 mm width, 10 mm thickness |
| material | aluminium |
| kind of actuation | horizontal force to the front main strut |

The model relates to a high-lift flap of a big commercial airplane.

Figure 11:
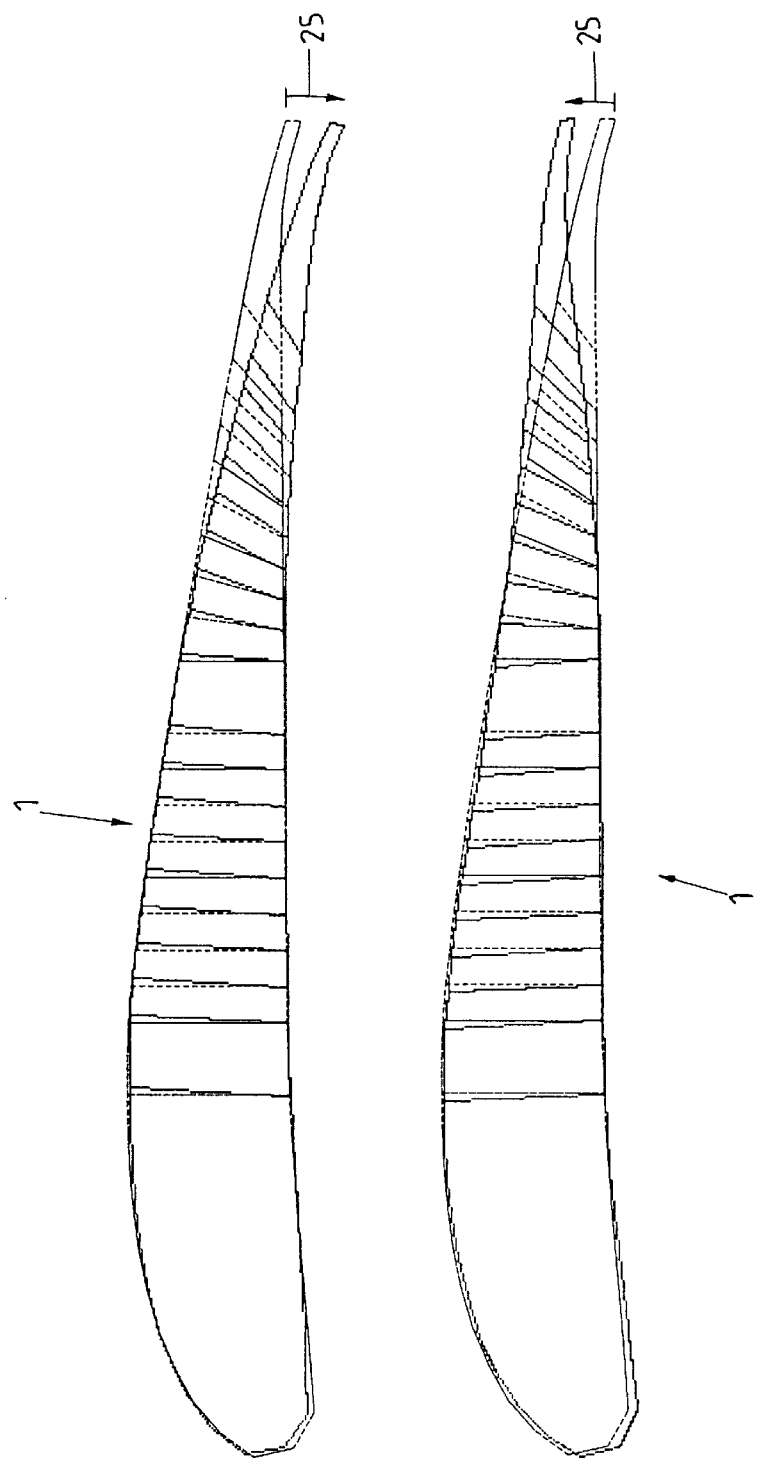
FIG. 11 shows the result of two FEM-simulations concerning a cambering and a de-cambering of the ribs according to FIG. 7.

FIG. 11 shows the deformation of the rib 1 due to a horizontal force of 2600 N on the front main strut 14 in the direction of the arrow 21 of FIG. 10. According to FIG. 11a, the force is directed to the right accomplishing a cambering of the rib 1. On contrary, the force with regard to FIG. 11b is directed to the left and causes a de-cambering of the rib 1. Nevertheless, in both cases, the vertical excursions 25 of the rib 1 at the trailing edge are in the order of 47 mm, but they are of different directions. Because of this, the aerodynamic properties of an aerodynamic structure with the rib 1 can be varied to a considerable extent.

Figure 12:
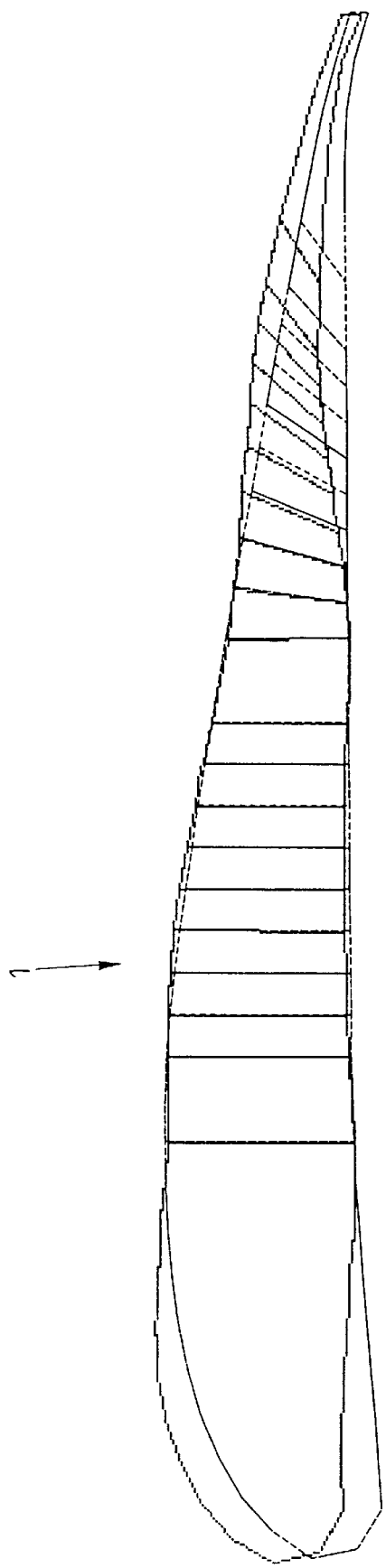
FIG. 12 illustrates a FEM-simulation of operation load referring to the stability of profile of the rib according to FIG. 7.

The result of a further FEM-simulation is illustrated in FIG. 12 and is related to the form stability of the rib 1, according to FIG. 7 and with the above mentioned data, with regard to external forces. A typical operating load of 3000 N/m is taken as a basis for the force. The maximum excursion resulting from this operating load is shown considerably enlarged in FIG. 12. In vertical direction, the excursion is in no location more than 3 mm. This means, the passive deformation of the rib 1 effected by the operating load is by more than one order of magnitude smaller than the deliberate deformation of the rib 1 according to FIG. 11.

Figure 13:
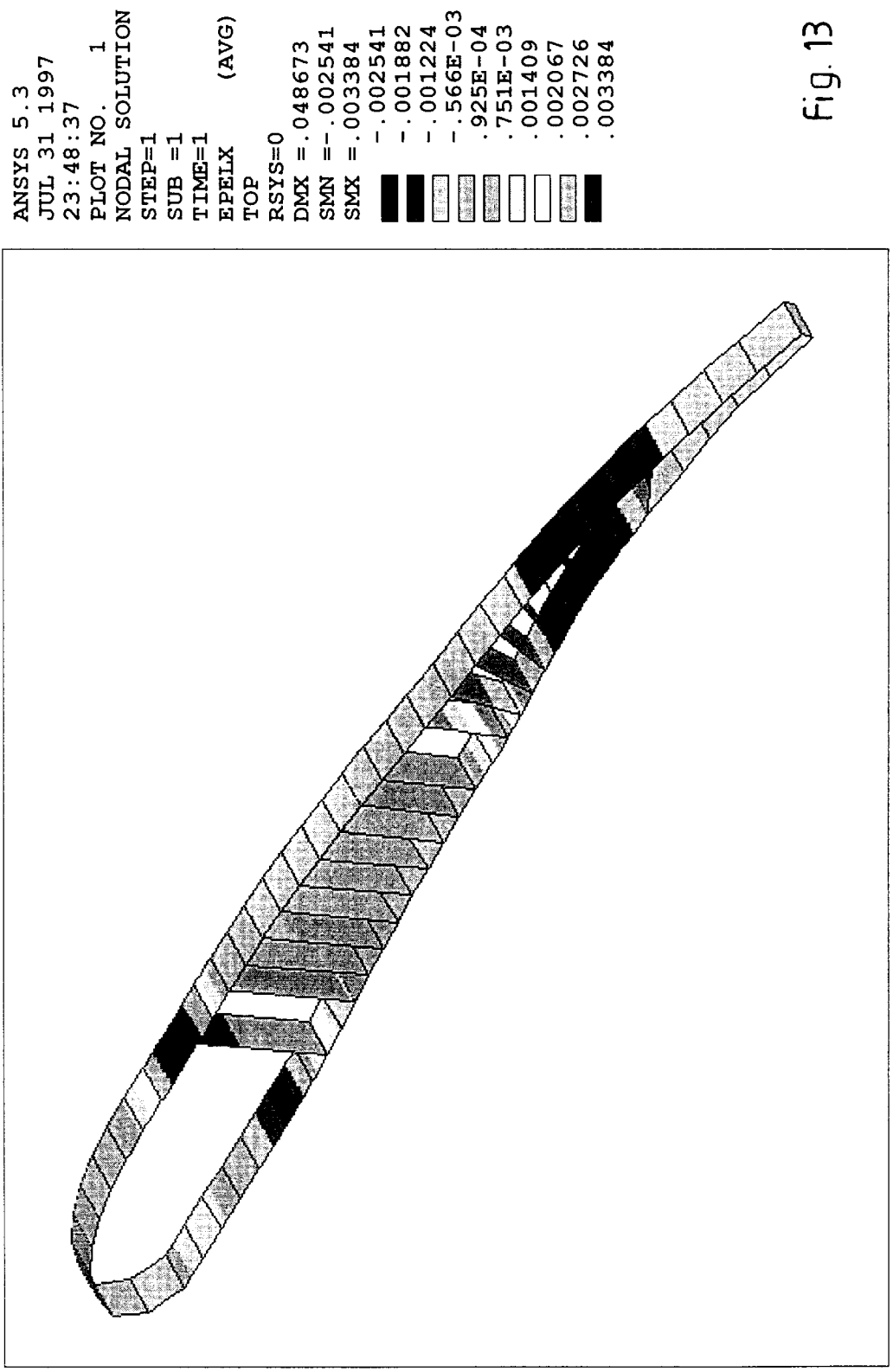
FIG. 13 shows the result of a further FEM-simulation relating to the expansion of the single structural regions of the rib according to FIG. 7.

FIG. 13 describes the result of a further FEM-calculation. A maximum load expected in operation (manoeuvre load) is taken as a basis for the calculation and provided with a safety factor of 1,5. Thus, the result of a nominal load of 8000 N/m is given. The maximum expansion in the region of the girdle 2 and the stiffening struts 3 is 0,34%, and thus, is in the uncritical range.

The rib 1 according to FIG. 7 provides a particularly low energy balance in case of an application of an actuator for its deformation. Due to stiffening struts 3 arranged according to aerodynamical principles, in wide regions of the profile the direction of the excursion is opposite to the direction of excursion in the cambering region. Consequently, a part of the mechanical energy, which is necessary for example to lower the cambering region, is provided by aerodynamic forces on the other regions of the profile.

Figure 14:
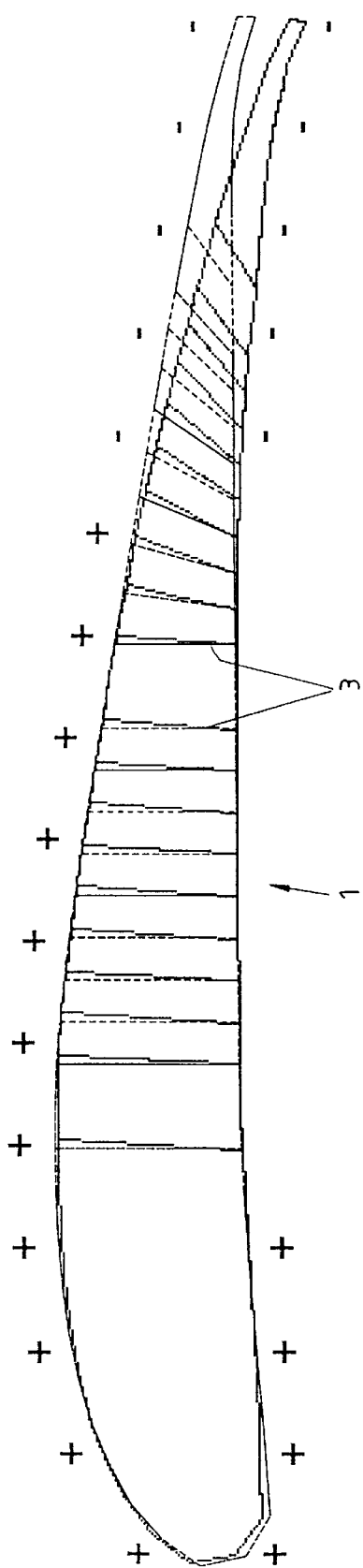
FIG. 14 is an illustration of the energy balance during deformation of the rib 7 according to FIG. 9.

Referring to FIG. 14, those regions, in which aerodynamic forces opposite to the deformation occur, are labelled with a minus sign. On the other hand, those regions, in which aerodynamic forces supporting the deformation occur, are labelled with a plus sign. The relatively great portion of the plus sign labelled regions make plain, that there is a possibility to obtain energy, which is required for the deformation of the rib 1. Up to 50% of the total deformation energy can obtained in this way.

Figure 15:
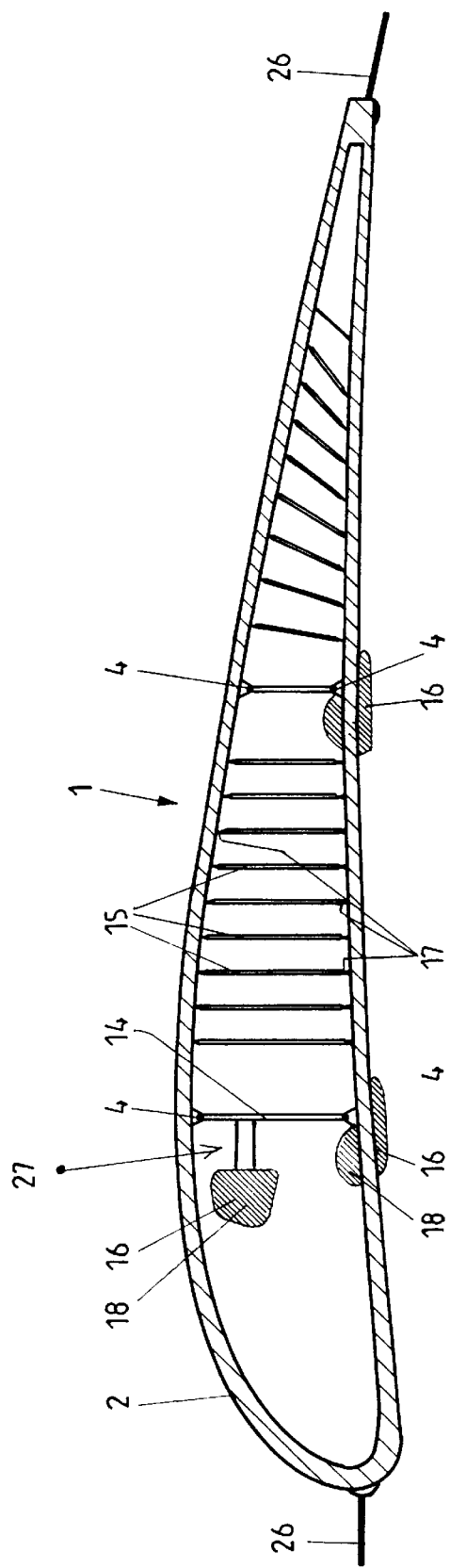
FIG. 15 shows the use of an aerodynamic actuator for the deformation of the rib according to FIG. 7.

FIG. 15 out-lines, how additional aerodynamic forces can be generated in the nose region and/or in the trailing edge region by means of aerodynamic actuators 26, so that the intended deformation of the rib 1 can be exclusively accomplished by this aerodynamic forces. For example, the aerodynamic actuators 26 can be active flaps, which are adjustable in different angles to the external girdle 2. With such aerodynamic actuators 26 aerodynamic forces can be caused which are directed in the direction of the arrows 19 and 20 shown in FIG. 10 or opposite to them. But, the aerodynamic forces are not suitable for keeping a constant deformation of the rib 1. Therefore, an additional interlocking mechanism 27 is provided, acting between the front spar 18 of the supporting structure 16 and the front main strut 14, here. The aerodynamic actuators 26 are only necessary and therefor only activated up to the time at which the intended deformation is given. Then, the deformation is fixed by means of the interlocking mechanism 27. Subsequently, the aerodynamic actuators 26 can be guided back to their neutral position, for example to prevent the cause of an additional aerodynamical resistance. Instead of the flap-shaped aerodynamic actuators according to FIG. 15, active deformable elements of the aerodynamic structure with integrated solid state actuators are also possible as aerodynamic actuators.

For the specific case of a high-lift flap of a big commercial airplane, a special concept of drive for the intended deformation of the rib 1 of FIG. 7 was developed. The concept of drive utilizes an existing drive for the high-lift flap to deform the aerodynamic structure and requires no additional actuatoric. Referring to FIG. 16, this concept of drive is explained in the following. The rib 1 is provided with two couple mechanisms 28 and 29. The region of the external girdle 2 is optionally firmly connected to the supporting structure 16 or to higher order structure 30, for example to the wing box of the wing, at which the high-lift flap is jointed. The couple mechanisms 28 and 29 can be constructed like a brake or a coupling, for example. If the high-lift flap is driven in by the flap drive, while the couple mechanism 29 is active between the external girdle and the primary structure 30, the external girdle is deformed in such a way, that the back deformation region cambers (FIG. 16b). If the couple mechanism 28 to the supporting structure 16 is now activated and the couple mechanism 29 is deactivated, the deformed high-lift flap can be driven back in its original position (FIG. 16c)). With a similar concept, other aerodynamic structures can be deformed, for example ailerons, elevators or rudders.

REFERENCE LIST

1—rib
2—external girdle
3—stiffening strut
4—joint
5—side of overpressure
6—side of negative pressure
7—angle of inclination
8—angle of inclination
9—aerodynamic structure
10—mechanical actuator
11—outer skin
12—air stream direction
13—transition region
14—main strut
15—secondary strut
16—supporting structure
17—predetermined bending point
18—spar
19—arrow
20—arrow
21—arrow
22—arrow
23—rotating arrow
24—rotating arrow
25—excursion
26—aerodynamic actuator
27—interlocking mechanism
28—couple mechanism
29—couple mechanism
30—higher ordered structure

We claim:

1. An aerodynamic structure for use in a landing flap, an airfoil, an elevator unit and a rudder unit, said aerodynamic structure comprising:
   at least one outer skin having a course and being actively deformable in cross section longitudinal to an air stream direction; and
   a plurality of actively deformable ribs stiffening said outer skin in cross section longitudinal to said air stream direction,
   each of said actively deformable ribs being of changeable cambering and including a closed flexible external girdle and a plurality of stiffening struts of constant length,
      each of said external girdles having an outer shape determining the course of said outer skin,
      each of said stiffening struts of constant length at both ends being connected to one of said external girdles.

2. The aerodynamic structure of claim 1, wherein each of said ribs includes at least one mechanical actuator engaging said external girdle and said stiffening struts, the angle of inclination between said external girdle and said engaged stiffening struts being changed by a drive of said actuator.

3. The aerodynamic structure of claim 1, wherein a mechanism to move said aerodynamic structure is provided for deforming said ribs.

4. The aerodynamic structure of claim 1, wherein at least one aerodynamic actuator is provided for deforming said ribs, each of said aerodynamic actuators directly or indirectly engaging said external girdle.

5. The aerodynamic structure of claim 1, wherein said stiffening struts engage said external girdle in such a way that aerodynamic forces are provided, the aerodynamic forces supporting a modification of said ribs.

6. The aerodynamic structure of claim 1, wherein said outer skin is firmly connected to said ribs.

7. The aerodynamic structure of claim 1, wherein said stiffening struts engage said external girdle via joints.

8. The aerodynamic structure of claim 1, and comprising a concave-curved side of overpressure and a convex-curved side of negative pressure, wherein the distance between two neighbouring stiffening struts is smaller on said concave-curved side of overpressure than on said convex-curved side of negative pressure.

9. The aerodynamic structure of claim 1, wherein a plurality of ribs is provided, which are laterally arranged side by side and which are indecently driveable, providing a torsion of said stressed skin around a cross axle.

10. The aerodynamic structure of claim 1, wherein said external girdle of each of said ribs is integrated in said outer skin.

11. The aerodynamic structure of claim 1, wherein each of said ribs includes at least one mechanical actuator engaging said external girdle, the angle of inclination between said external girdle and said engaged stiffing struts being changed by a drive of said actuator.

12. The aerodynamic structure of claim 1, wherein each of said ribs includes at least one mechanical actuator engaging said stiffening struts, the angle of inclination between said external girdle and said engaged stiffening struts being changed by a drive of said actuator.

* * * * *